(12) United States Patent
Yang et al.

(10) Patent No.: US 9,476,647 B2
(45) Date of Patent: Oct. 25, 2016

(54) PRODUCTION LINE OVEN

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Ya-Dong Zhang, Jiashan (CN); Jing-Ping Zheng, Zhejiang (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 124 days.

(21) Appl. No.: 14/517,326

(22) Filed: Oct. 17, 2014

(65) Prior Publication Data

US 2015/0125237 A1 May 7, 2015

(30) Foreign Application Priority Data

Nov. 6, 2013 (CN) .................... 2013 2 0694841 U

(51) Int. Cl.
| | |
|---|---|
| B65G 25/00 | (2006.01) |
| F27D 3/06 | (2006.01) |
| B25J 9/00 | (2006.01) |
| B25J 9/02 | (2006.01) |
| B25J 15/06 | (2006.01) |
| F27B 9/24 | (2006.01) |

(52) U.S. Cl.
CPC ................ *F27D 3/06* (2013.01); *B25J 9/0084* (2013.01); *B25J 9/0093* (2013.01); *B25J 9/023* (2013.01); *B25J 15/0616* (2013.01); *F27B 9/24* (2013.01)

(58) Field of Classification Search
CPC .......... F27B 9/24; F27B 9/145; F27B 9/207; F27D 3/06
USPC .............. 414/152, 153, 172, 222.09, 222.11, 414/225.01, 751.1, 751.2, 804, 806, 814
See application file for complete search history.

(56) References Cited

U.S. PATENT DOCUMENTS

| | | | | |
|---|---|---|---|---|
| 6,027,262 | A * | 2/2000 | Akimoto ........... | H01L 21/67178 396/611 |
| 8,820,162 | B2 * | 9/2014 | Takahashi ............ | B25J 15/0616 73/584 |
| 8,920,108 | B2 * | 12/2014 | Naumann .............. | B21D 43/05 414/226.05 |
| 2012/0141236 | A1 * | 6/2012 | Korner ................. | B65G 1/0407 414/222.01 |

* cited by examiner

*Primary Examiner* — Patrick Maestri
(74) *Attorney, Agent, or Firm* — Zhigang Ma

(57) ABSTRACT

A production line oven includes a product gripping mechanism mounted above one side of the production line oven, a plurality of fixtures, a fixture gripping mechanism mounted under the product gripping mechanism, a lifting mechanism, and a conveyor mounted in other side of the production line oven. The product gripping mechanism includes a first guide rail, a support arm mounted to the first guide rail in sliding, and mechanical gripping members connected to the support arm. The fixture gripping mechanism includes a second guide rail and a clamp mechanism mounted to the second guide rail in sliding. The mechanical gripping members are configured to grip of a product. The fixture gripping mechanism is configured to grasp each the fixture to assemble or dismount the fixtures.

12 Claims, 5 Drawing Sheets

PRODUCTION LINE OVEN

FIELD

The subject matter herein generally relates to the field of manufacturing processes, and in particular to a heating process.

BACKGROUND

An oven is used in a variety of industries including electronics, baking, and painting. Generally, the oven is gas-heated. In the heating area, gas-heated infrared radiators or gas burners are arranged along the pathway through the oven. A typical oven has one or more conveyors running through the heating area. Each conveyor (in the form of a belt, for example) transports work pieces through the heating area at a speed calculated to properly heat the work pieces on the conveyor belt.

BRIEF DESCRIPTION OF THE DRAWINGS

Implementations of the present technology will now be described, by way of example only, with reference to the attached figures.

DETAILED DESCRIPTION

Figure 1:
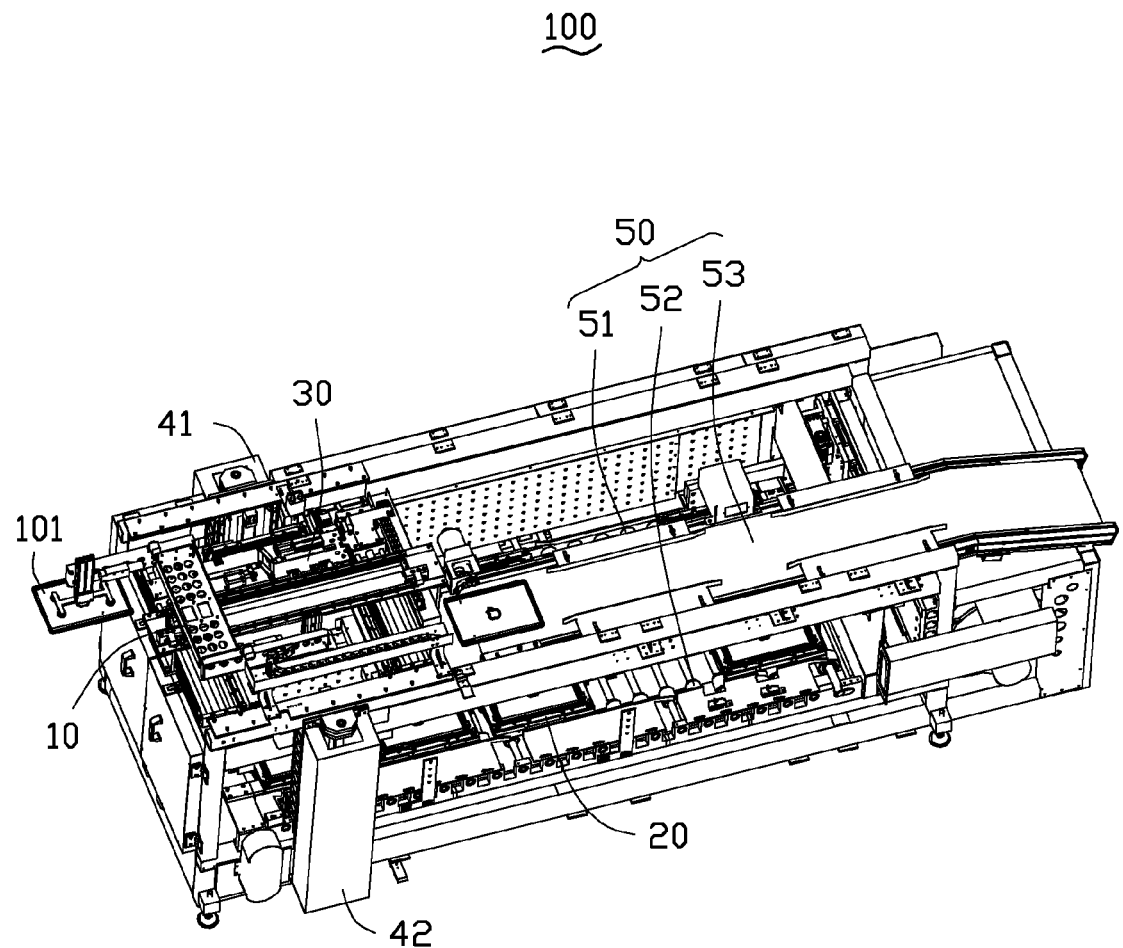
FIG. 1 is a perspective view of a production line oven according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates a production line oven 100 according to an embodiment of this disclosure which can include a product gripping mechanism 10, a plurality of fixtures 20, a fixture gripping mechanism 30, a first lifting arm 41, a second lifting arm 42, and a conveyor 50.

The product gripping mechanism 10 can be mounted above one side of the production line oven 100. The fixture gripping mechanism 30 can be mounted under the product gripping mechanism 10. The first lifting arm 41 and the second lifting arm 42 can be mounted to two other sides of the production line oven 100. The conveyor 50 can be mounted in the production line oven 100. The conveyor 50 can include a first conveyor 51, a second conveyor 52, and a third conveyor 53. The first conveyor 51 and the second conveyor 52 can be mounted in parallel on one side of the production line oven 100. The first conveyor 51 can transfer the fixtures 20 into a heating area, and the second conveyor 52 can transfer the fixtures 20 out of the heating area. The third conveyor 53 can be mounted above the second conveyor 52.

Figure 2:
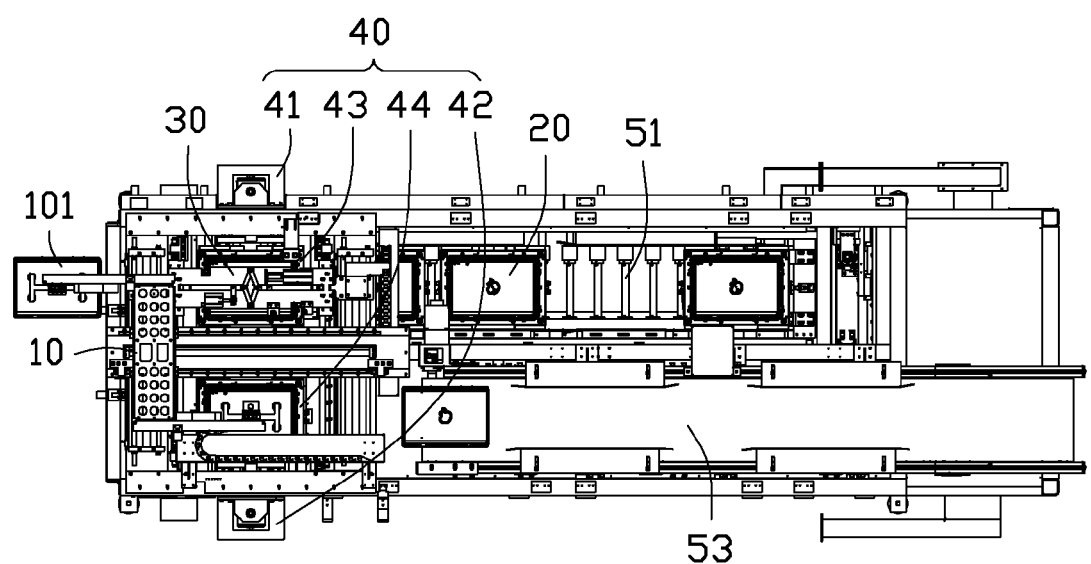
FIG. 2 is a top view of the production line oven as shown in FIG. 1.

FIG. 2 illustrates that the production line oven 100 can further include a lifting mechanism 40. The lifting mechanism 40 can include the first lifting arm 41, the second lifting arm 42, and can further include a first lifting table 43 connected to the first lifting arm 41 and a second lifting table 44 connected to the second lifting arm 42. The first lifting table 43 and the second lifting table 44 can be mounted under the fixture gripping mechanism 30. The first lifting table 43 and the second lifting table 44 can be moved up and down for a distance equal to the thickness of each fixture 20, by the first lifting arm 41 and the second lifting arm 42. The first lifting table 43 can be configured to place the fixtures 20 to be heated. The first lifting table 43 and the first conveyor 51 can be at the same level when the first lifting table 43 has moved down to the lowest position, and the fixtures 20 to be heated can be moved from the first lifting table 43 to the first conveyor 51. The second lifting table 44 can be configured to place the fixtures 20 after heating. The second lifting table 44 and the second conveyor 52 (shown in FIG. 1) can be at the same level when the second lifting table 44 has moved down to the lowest position, and the fixtures 20 after heating can be moved from the second conveyor 52 to the second lifting table 44.

The product gripping mechanism 10 can grip of a product 101 and put the product 101 into each fixture 20. The third conveyor 53 can transfer the product 101 after heat processing out of the production line oven 100.

In operation, the fixture gripping mechanism 30 can hold a vacant fixture 20, and move to the top of the first lifting table 43. The first lifting table 43 can move up a distance equal to the thickness of a fixture 20, and stack the vacant fixtures 20 into the hold of the fixture gripping mechanism 30. The fixture gripping mechanism 30 can grip of a vacant fixture 20 when a vacant fixture 20 is located on the first lifting table 43. Then, the second lifting table 44 can move up a distance equal to the thickness of a fixture 20. The product gripping mechanism 10 can grip of the product 101 to be processed, from the feeding port (not shown), and take the product 101 after processing from the fixture 20 onto the second lifting table 44.

The fixture gripping mechanism 30 can move to the top of the second lifting table 44, and the first lifting table 43 can move down, for a distance equal to the thickness of a fixture 20. The fixture gripping mechanism 30 can hold a vacant fixture 20, and the second lifting table 44 can move down for a distance equal to the thickness of a fixture 20. The vacant fixture 20 held by the fixture gripping mechanism 30 can be taken from the fixtures 20 on the second lifting table 44. The product gripping mechanism 10 can move to put the product 101 to be processed in a fixture 20 on the first lifting table 43, and put the product 101 after processing on the third conveyor 53.

The fixture gripping mechanism 30 can hold a vacant fixture 20, and move to the top of the first lifting table 43. The product gripping mechanism 10 can take the product 101 to be processed from the feeding port (not shown), and take the product 101 after processing from the fixture 20 on the second lifting table 44. The production line oven 100 can carry out this cycle continuously.

All of the fixtures 20 on the second lifting table 44 can be held on the first lifting table 43. Then, the first lifting table 43 can be moved down to the lowest position, to be at the same level as the first conveyor 51. The fixtures 20 can be sent to the first conveyor 51 from the first lifting table 43. Then, the first lifting table 43 can move up to the highest position, and the second lifting table 44 can move down to the lowest position to be at the same level as the second conveyor 52 (shown in FIG. 1). After heating, the fixtures 20 can be sent to the second lifting table 44 from the second conveyor 52, and the fixture gripping mechanism 30 can hold the fixtures 20 from the second lifting table 44 to the first lifting table 43. The production line oven 100 can function without an operator, and reduces labor cost and improves productivity.

Figure 3:
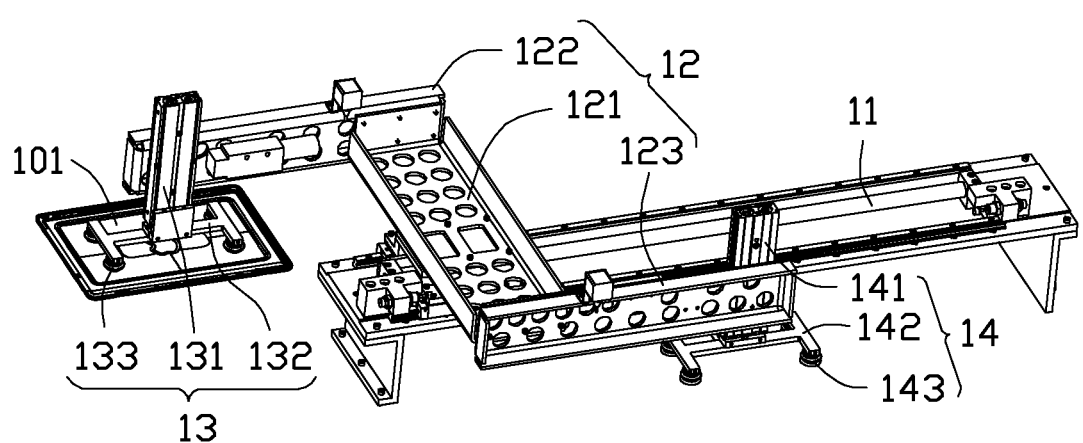
FIG. 3 is a perspective view of a product gripping mechanism of the production line oven as shown in FIG. 1.

FIG. 3 illustrates that the product gripping mechanism 10 can include a first guide rail 11 mounted to the production line oven 100, a support arm 12 mounted to the first guide rail 11 in sliding, a first mechanical gripping member 13 used for taking hold of the product 101, and a second mechanical gripping member 14 used for taking hold of the product 101.

The support arm 12 can be substantially "Z"-shaped and move along the first guide rail 11. The support arm 12 can include a main arm 121, a first side arm 122, and a second side arm 123 mounted on each side of the main arm 121.

The first mechanical gripping member 13 can be mounted to the first side arm 122 in sliding, and can include a first arm 131 and a first gripping hand 132 connected to the first arm 131. The first arm 131 can be connected to the first side arm 122, and move up and down vertically in relation to the first side arm 122. The first gripping hand 132 can include a plurality of first vacuum ejectors 133. A vacuum can be generated in each of the first vacuum ejectors 133 to vacuum-lift a product 101, and the release of the vacuum allows the first vacuum ejectors 133 to put down the product 101.

A structure of the second mechanical gripping member 14 can be substantially the same as the first mechanical gripping member 13. The second mechanical gripping member 14 can include a second arm 141 connected to the second side arm 123, a second gripping hand 142 connected to one side of the second arm 141, and a plurality of second vacuum ejectors 143 mounted to the second gripping hand 142.

The first mechanical gripping member 13 can grip of a product 101 to be processed and the second mechanical gripping member 14 can grip of the product 101 after processing when the support arm 12 can be moved to one side of the first guide rail 11. When the support arm 12 moved to the other side of the first guide rail 11, the first mechanical gripping member 13 can put the product 101 to be processed in the fixture 20 (shown in FIG. 2) and the second mechanical gripping member 14 can put the processed product 101 on the third conveyor 53 (shown in FIG. 2).

Figure 4:
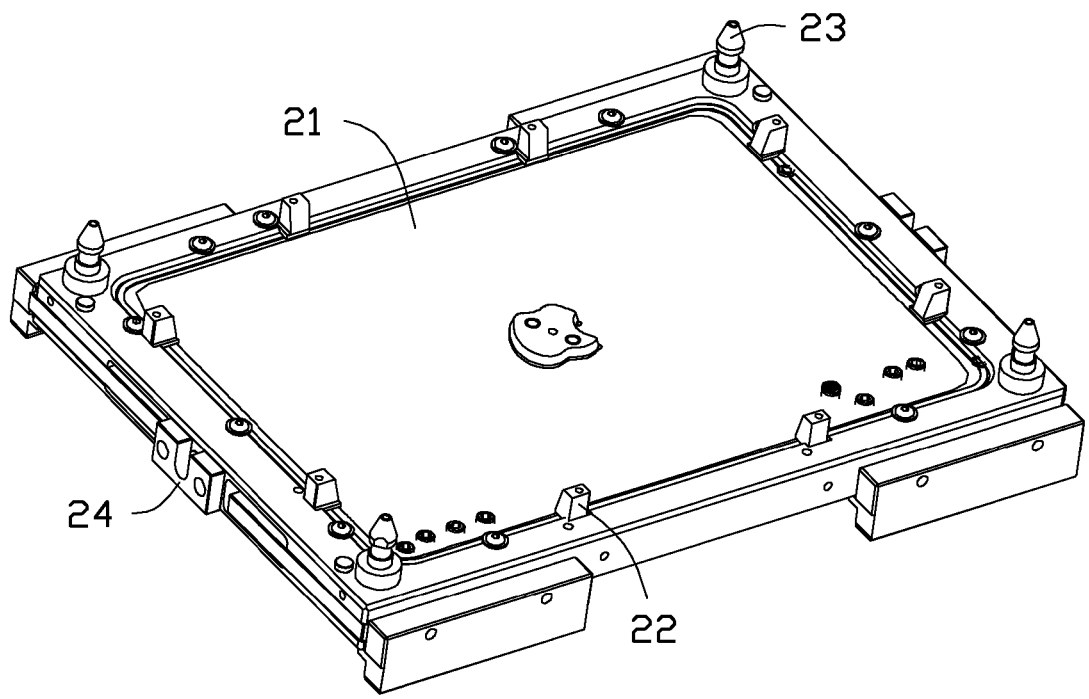
FIG. 4 is a perspective view of a fixture gripping mechanism of the production line oven as shown in FIG. 1.

FIG. 4 illustrates that each fixture 20 used to receive and locate a product 101 (shown in FIG. 3) can include a substantially rectangular receiving portion 21. Each side of the receiving portion 21 can include a plurality of guide blocks 22. A surface of each guide block 22 adjacent to the receiving portion 21 can be beveled. The guide blocks 22 can make the product 101 (shown in FIG. 3) slide in the receiving portion 21 along the bevel of the guide blocks 22.

Each fixture 20 can further include a pressing column 23 and two raised portions 24. The pressing column 23 can be a hollow structure and have an elastic latch (not shown) inside. Two pieces of the fixture 20 can be stacked together through the pressing column 23, and can be fixedly locked through the elastic latch in the pressing column 23. The raised portions 24 can be formed in the sides of each fixture 20. When each raised portion 24 is pressed to inside of each fixture 20, the elastic latch in the pressing column 23 can open, and the two stacked fixtures 20 can be separated. When the pressing is canceled, the elastic latch in the pressing column 23 can be locked, and the two stacked fixtures 20 can be fixedly locked. The fixtures 20 can be continuously re-used and not need to be removed from the production line oven 100.

Figure 5:
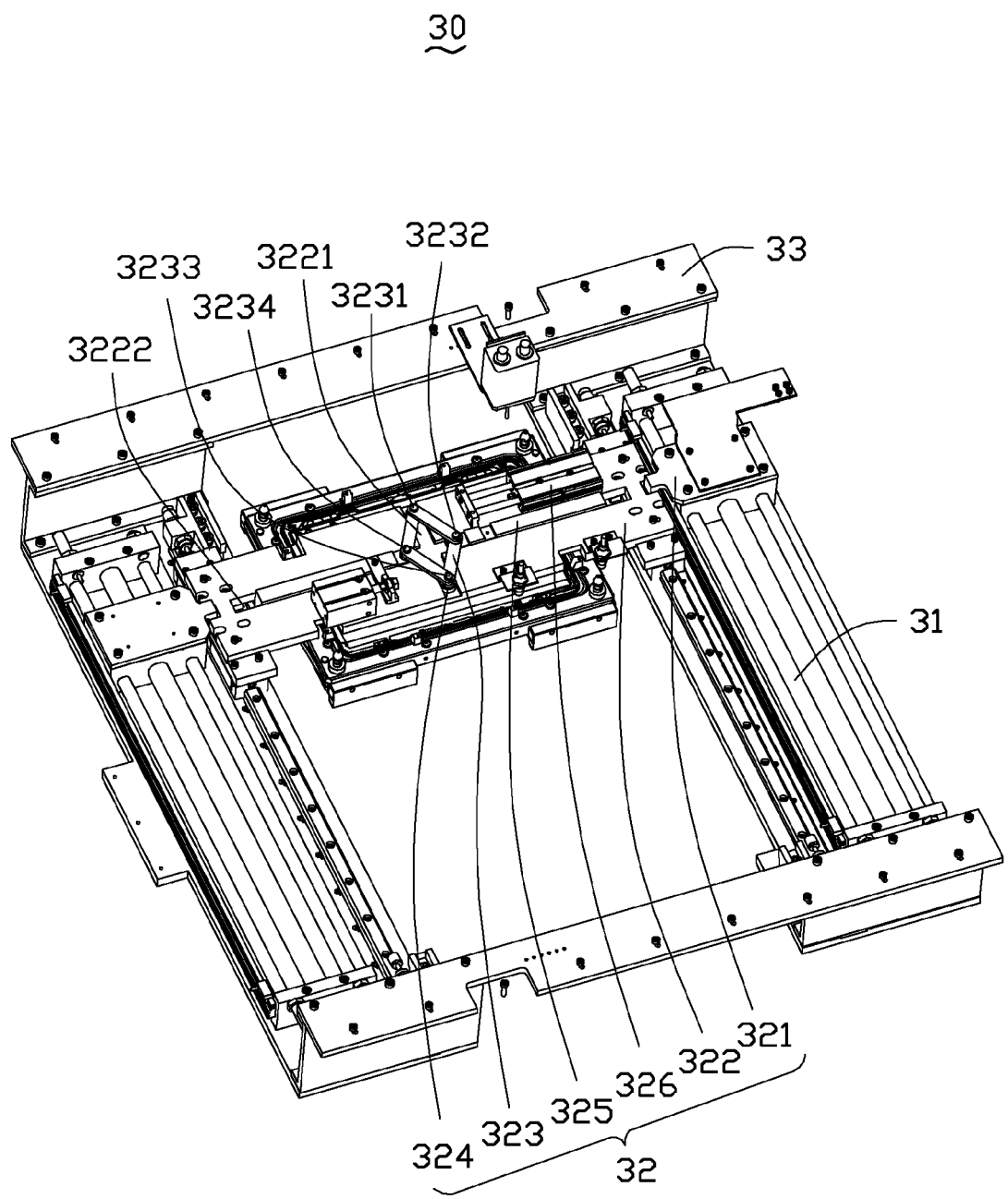
FIG. 5 is a perspective view of a fixture of the production line oven as shown in FIG. 1.

FIG. 5 illustrates that the fixture gripping mechanism 30 can include a second guide rail 31, a clamp mechanism 32, and a support portion 33 connected to the second guide rail 31.

The second guide rail 31 can include two rails mounted in parallel under the first guide rail 11 (shown in FIG. 3). An extending direction of the second guide rail 31 can be substantially perpendicular to an extending direction of the first guide rail 11.

The clamp mechanism 32 can include two sliding blocks 321, a plate 322 between the two sliding blocks 321, and a diamond frame 323 mounted to a substantially central position of the plate 322. The two sliding blocks 321 can be mounted to the two rails of the second guide rail 31, and can move along the second guide rail 31. Ends of the plate 322 can be mounted to the sliding blocks 321. The plate 322 can define a slot 3221, and a hollow portion 3222 perpendicular to an extending direction of the slot 3221. The diamond frame 323 can include four equal-length rigid structures (not labeled), and the four vertexes of the diamond frame 323 can be secured by rivets. The four rigid structures of the diamond frame 323 can articulate and vary their angles around the four vertexes. The four riveted vertexes can respectively form a first connected portion 3231, a second connected portion 3232, a third connected portion 3233, and a fourth connected portion 3234.

The clamp mechanism 32 can further include two connection blocks 324 mounted in the slot 3221, two transmission hands 325 mounted in the hollow portion 3222, and an air cylinder 326 mounted to the plate 322. The connection blocks 324 can be connected to each of the first connected portion 3231 and the third connected portion 3233. Thus, the first connected portion 3231 and the third connected portion 3233 can move towards or away from the center of the plate 322 along the slot 3221. Each transmission hand 325 can be substantially "L"-shaped. Ends of the two transmission hands 325 can be respectively connected to the second connected portion 3232 and the fourth connected portion 3234. The other ends of the two transmission hands 325 can combine to hold each fixture 20 (shown in FIG. 4). The air cylinder 326 can drive each transmission hand 325 to move.

When the two transmission hands 325 are moved towards the center of the plate 322, the two transmission hands 325 can press the two raised portions 24 (shown in FIG. 4) to the inside of each fixture 20, and when the two transmission hands 325 are moved away from the center of the plate 322, the two transmission hands 325 can carry a fixtures 20 away.

The support portion 33 can be mounted to the ends of the second guide rail 31, and configured to fix the fixture gripping mechanism 30 on the production line oven 100.

The embodiments shown and described above are only examples. Many details are often found in the art such as the other features of the production line oven 100. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A production line oven comprising:
   a plurality of sides;
   a product gripping mechanism mounted above one side of the plurality sides of the production line oven and comprising:
     a first guide rail,
     a support arm slidably mounted to the first guide rail,
     mechanical gripping members slidably mounted to the support arm;
   a plurality of fixtures comprising a receiving portion configured to receive a product;
   a fixture gripping mechanism mounted under the product gripping mechanism, and comprising
     a second guide rail,
     a clamp mechanism slidably mounted to the second guide rail;
   a lifting mechanism mounted to two sides of the plurality sides of the production line oven; and
   a conveyor mounted in another side of the plurality sides of the production line oven;
   wherein the mechanical gripping members are configured to grip of a product;
   the fixture gripping mechanism is configured to assemble a vacant fixture with the plurality of fixtures and separate the vacant fixture from the plurality of fixtures; and
   wherein the clamp mechanism comprises a plurality of sliding blocks, a plate mounted between the sliding blocks and defining a slot and a hollow portion perpendicular to an extending direction of the slot, a diamond frame mounted to a central position of the plate, two connection blocks mounted in the slot, and two transmission hands mounted in the hollow portion.

2. The production line oven as claimed in claim 1, wherein the support arm is "Z"-shaped, and comprises a main arm and two side arms mounted on each side of the main arm.

3. The production line oven as claimed in claim 1, wherein
   the mechanical gripping members comprises arms and gripping hands connected to the arms; and
   the arms are connected to the side arms, and can move up and down vertically in relation to the side arms.

4. The production line oven as claimed in claim 3, wherein the gripping hands comprise a plurality of vacuum ejectors configured to vacuum-lift a product.

5. The production line oven as claimed in claim 1, wherein
   the clamp mechanism further comprises an air cylinder mounted to the plate; and
   the diamond frame comprises a first connected portion, a second connected portion, a third connected portion, and a fourth connected portion in four vertexes of the diamond frame.

6. The production line oven as claimed in claim 5, wherein
   the two connection blocks are connected to each of the first connected portion and the third connected portion;
   the two transmission hands are connected to each of the second connected portion and the fourth connected portion;
   the two transmission hands are received in the hollow portion; and
   the air cylinder is configured to drive each transmission hand to move.

7. The production line oven as claimed in claim 1, wherein
   the fixture gripping mechanism further comprises a support portion connected to the second guide rail; and
   the support portion is mounted to the ends of the second guide rail and configured to fix the fixture gripping mechanism on the production line oven.

8. The production line oven as claimed in claim 1, wherein
   each side of the receiving portion comprises a plurality of guide blocks; and
   a surface of each guide block adjacent to the receiving portion can be a bevel.

9. The production line oven as claimed in claim 1, wherein each fixture comprises a pressing column configured to stack two pieces of fixture together and two raised portions formed in the sides of each fixture.

10. The production line oven as claimed in claim 1, wherein the lifting mechanism comprises a first lifting arm, a second lifting arm, a first lifting table connected to the first lifting arm, and a second lifting table connected to the second lifting arm.

11. The production line oven as claimed in claim 10, wherein
    the first lifting table and the second lifting table are mounted under the fixture gripping mechanism; and
    the first lifting table and the second lifting table can be moved up and down by the first lifting arm and the second lifting arm.

12. The production line oven as claimed in claim 1, wherein
    the conveyor comprises a first conveyor, a second conveyor, and a third conveyor; and
    the first conveyor and the second conveyor are mounted in parallel on one side of the production line oven, and the third conveyor is mounted above the second conveyor.

* * * * *